US012755967B2

(12) United States Patent
Jo et al.

(10) Patent No.: US 12,755,967 B2
(45) Date of Patent: Oct. 6, 2026

(54) COMPOSITE CATHODE ACTIVE MATERIAL, CATHODE AND LITHIUM BATTERY EMPLOYING SAME, AND METHOD FOR MANUFACTURING SAME

(71) Applicant: Samsung SDI Co., Ltd., Yongin-si (KR)

(72) Inventors: Sungnim Jo, Yongin-si (KR); Sangkook Mah, Yongin-si (KR); Inhyuk Son, Yongin-si (KR); Guesung Kim, Yongin-si (KR); Jongseok Moon, Yongin-si (KR); Andrei Kapylou, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 486 days.

(21) Appl. No.: 18/549,572

(22) PCT Filed: Mar. 10, 2022

(86) PCT No.: PCT/KR2022/003366
§ 371 (c)(1),
(2) Date: Sep. 7, 2023

(87) PCT Pub. No.: WO2022/191639
PCT Pub. Date: Sep. 15, 2022

(65) Prior Publication Data

US 2024/0170666 A1 May 23, 2024

(30) Foreign Application Priority Data

Mar. 10, 2021 (KR) ........................ 10-2021-0031461

(51) Int. Cl.
*H01M 4/525* (2010.01)
*H01M 4/02* (2006.01)
(Continued)

(52) U.S. Cl.
CPC ............. *H01M 4/525* (2013.01); *H01M 4/04* (2013.01); *H01M 4/362* (2013.01); *H01M 4/583* (2013.01);
(Continued)

(58) Field of Classification Search
CPC ...... H01M 4/505; H01M 4/525; H01M 4/583; H01M 4/366
See application file for complete search history.

(56) References Cited

U.S. PATENT DOCUMENTS

2013/0183579 A1 7/2013 Kim et al.
2015/0037680 A1 2/2015 Park et al.
(Continued)

FOREIGN PATENT DOCUMENTS

CN 111009640 A 4/2020
CN 111082046 A 4/2020
(Continued)

OTHER PUBLICATIONS

Wang, Kai, et al., "Recent advances and historical developments of high voltage lithium cobalt oxide materials for rechargeable Li-ion batteries," Journal of Power Sources, vol. 460, 2020, 16 pages.
(Continued)

*Primary Examiner* — Christopher P Domone
(74) *Attorney, Agent, or Firm* — Womble Bond Dickinson (US) LLP

(57) ABSTRACT

Provided are a composite cathode active material, a cathode and a lithium battery that include the same, and a method of preparing the composite cathode active material, the composite cathode active material comprising: a core; and a first shell and a second shell that are disposed on an outer side of a surface of the core, wherein the first shell includes at least one first metal compound represented by Formula $X_aO_b$ (where $0<a\leq3$, $0<b\leq4$, and when a is 1, 2, or 3, b is an
(Continued)

integer) or Formula $X_a(OH)_b$ (where $0<a\leq 3$, $0<b\leq 4$, and when a is 1, 2, or 3, b is an integer), the second shell includes at least one second metal compound represented by Formula $Y_cO_d$ (where $0<c\leq 3$, $0<d<4$, and when c is 1, 2, or 3, d is not an integer); and graphene, the at least one second metal compound is disposed in a graphene matrix, X and Y are each independently a metal selected from Groups 2 to 13, 15, and 16 of the Periodic Table of Elements.

20 Claims, 1 Drawing Sheet

(51) Int. Cl.
*H01M 4/04* (2006.01)
*H01M 4/36* (2006.01)
*H01M 4/583* (2010.01)
*H01M 10/052* (2010.01)

(52) U.S. Cl.
CPC .... *H01M 10/052* (2013.01); *H01M 2004/028* (2013.01)

(56) References Cited

U.S. PATENT DOCUMENTS

| | | | | |
|---|---|---|---|---|
| 2015/0099181 | A1 | 4/2015 | Watanabe et al. | |
| 2015/0111106 | A1 | 4/2015 | Son et al. | |
| 2015/0314275 | A1 | 11/2015 | Cho et al. | |
| 2017/0207444 | A1 | 7/2017 | Yanagihara et al. | |
| 2019/0148711 | A1* | 5/2019 | Jo | C01G 51/42 429/231.95 |
| 2020/0112024 | A1* | 4/2020 | Shin | C01G 53/44 |
| 2020/0136132 | A1 | 4/2020 | Hong et al. | |
| 2021/0376309 | A1 | 12/2021 | Son et al. | |
| 2024/0258517 | A1 | 8/2024 | Shin et al. | |

FOREIGN PATENT DOCUMENTS

| | | | |
|---|---|---|---|
| EP | 1331683 | A2 | 7/2003 |
| EP | 3923380 | A1 | 12/2021 |
| JP | 2008-16244 | A | 1/2008 |
| JP | 2012-169217 | A | 9/2012 |
| JP | 2016-33902 | A | 3/2016 |
| JP | 2017-168301 | A | 9/2017 |
| JP | 2019-509599 | A | 4/2019 |
| JP | 2020-61360 | A | 4/2020 |
| KR | 10-2013-0084616 | A | 7/2013 |
| KR | 10-2014-0085368 | A | 7/2014 |
| KR | 10-2015-0017012 | A | 2/2015 |
| KR | 10-2015-0045337 | A | 4/2015 |
| KR | 10-2015-0060467 | A | 6/2015 |
| KR | 10-2016-0093854 | A | 8/2016 |
| KR | 10-2016-0126840 | A | 11/2016 |
| KR | 10-2019-0023629 | A | 3/2019 |
| KR | 10-2019-0025632 | A | 3/2019 |
| KR | 10-2093336 | B1 | 3/2020 |
| KR | 10-2020-0046485 | A | 5/2020 |

OTHER PUBLICATIONS

Heo, Yuseon, et al., "The influence of Al (OH)3-coated graphene oxide on improved thermal conductivity and maintained electrical resistivity of Al2O3/epoxy composites," Journal of Nanoparticle Research, vol. 14, 2012, 11 pages.

Extended European Search Report dated Feb. 26, 2025, issued in corresponding EP Application No. 22767535.2, 11 pages.

Yang, H., et al., "Graphene@TiO2 co-modified LiNi0.6Co0.2Mn0.2O2 cathode materials with enhanced electrochemical performance under harsh conditions," Electrochimica Acta, vol. 289, 2018, pp. 149-157.

Korean Notice of Allowance dated Jun. 26, 2024, issued in Korean Patent Application No. 10-2021-0031461, 3 pages.

Japanese Office Action dated Nov. 5, 2024, issued in Japanese Patent Application No. 2023-553690, 5 pages.

International Search Report of PCT/KR2022/003366, Jun. 22, 2022, 5 pp.

Heo, et al., "The influence of Al (Oh) 3-coated graphene oxide on improved thermal conductivity and maintained electrical resistivity of Al2O3/epoxy composites" Journal of Nanoparticle Research, 2012, vol. 14, thesis No. 1196, pp. 1-10 (On Order).

Chinese Notification of First Office Action, for Patent Application No. 202280020506.1, dated Mar. 30, 2026, 7 pages.

* cited by examiner

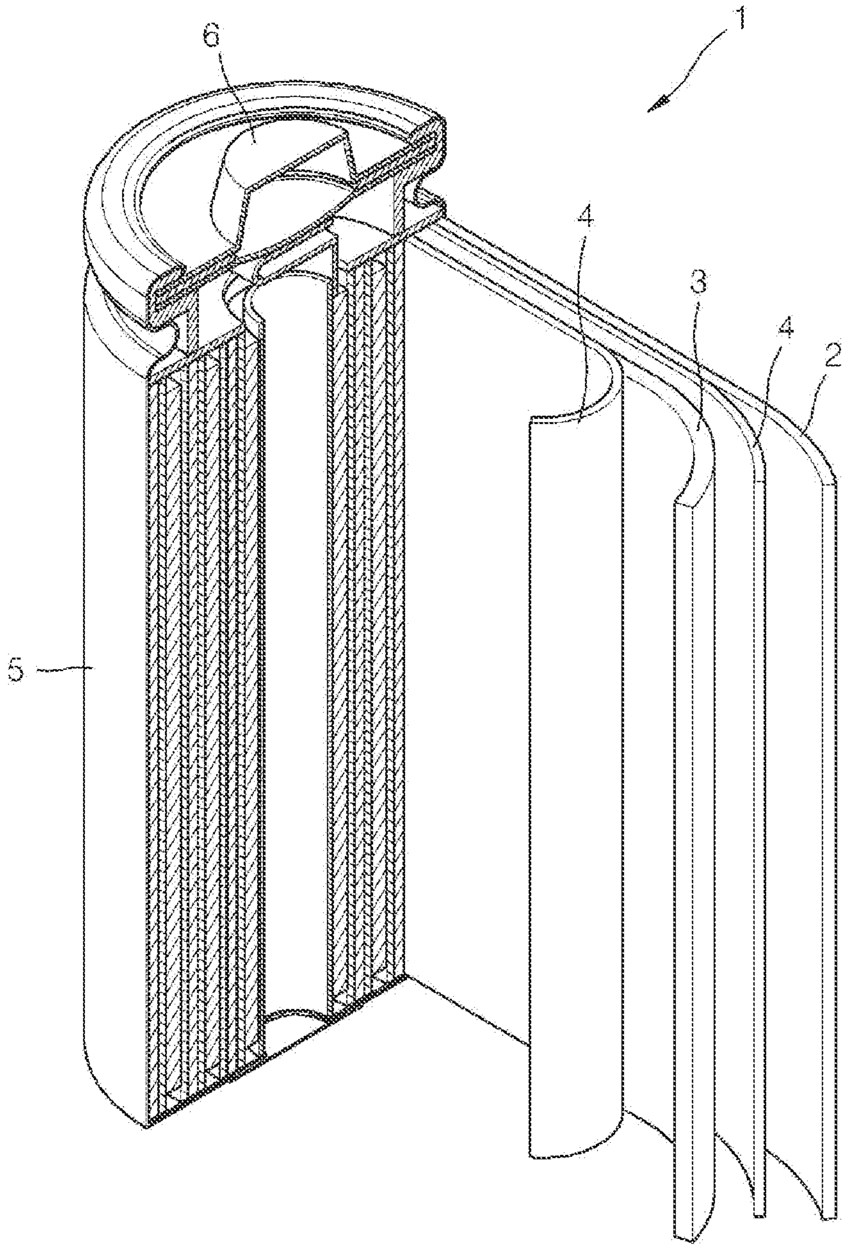
1
6
4
3
4
2
5

COMPOSITE CATHODE ACTIVE MATERIAL, CATHODE AND LITHIUM BATTERY EMPLOYING SAME, AND METHOD FOR MANUFACTURING SAME

CROSS-REFERENCE TO RELATED APPLICATIONS

This application is a U.S. National Phase Patent Application of International Application Number PCT/KR2022/003366, filed on Mar. 10, 2022, which claims priority to Korean Patent Application Number 10-2021-0031461, filed on Mar. 10, 2021, the entire content of each of which is incorporated herein by reference.

TECHNICAL FIELD

The present disclosure relates to a composite cathode active material, a cathode and a lithium battery that include the composite cathode active material, and a method of preparing the composite cathode active material.

BACKGROUND ART

For miniaturization and high performance of various devices, high energy density of lithium batteries is becoming more important in addition to miniaturization and lighter weight. In other words, high-capacity lithium batteries are becoming important.

To implement lithium batteries suitable for the above use, cathode active materials having high capacity are being considered.

Nickel-based cathode active materials of the related art have degraded lifespan characteristics and poor thermal stability due to side reactions.

Therefore, there is a need for a method capable of preventing deterioration of battery performance while including a nickel-based cathode active material.

DISCLOSURE

Technical Problem

An aspect provides a novel composite cathode active material capable of inhibiting a side reaction of a composite cathode active material to prevent deterioration of battery performance.

Another aspect provides a cathode including the composite cathode active material.

Another aspect provides a lithium battery including the cathode.

Another aspect provides a method of preparing the composite cathode active material.

Technical Solution

According to one or more embodiments, provided is a composite cathode active material including:

a core including a lithium transition metal oxide; and a first shell and a second shell that are disposed on an outer side of a surface of the core, wherein the first shell includes at least one first metal compound represented by Formula $X_aO_b$ (where $0<a\leq 3$, $0<b\leq 4$, and when a is 1, 2, or 3, b is an integer) or Formula $X_a(OH)_b$ (where $0<a\leq 3$, $0<b\leq 4$, and when a is 1, 2, or 3, b is an integer), the second shell includes: at least one second metal compound represented by Formula $Y_cO_d$ (where $0<c\leq 3$, $0<d<4$, and when c is 1, 2, or 3, d is not an integer); and graphene, the at least one second metal compound is disposed in a graphene matrix, and X and Y are each independently at least one metal selected from Groups 2 to 13, 15, and 16 of the Periodic Table of Elements.

According to another aspect, provided is a cathode including the cathode active material.

According to another aspect, provided is a lithium battery including the cathode.

According to another aspect, provided is a method of preparing the composite cathode active material, the method including:

providing a lithium transition metal oxide;

providing at least one first metal compound represented by Formula $X_aO_b$ (where $0<a\leq 3$, $0<b\leq 4$, and when a is 1, 2, or 3, b is an integer) or Formula $X_a(OH)_b$ (where $0<a\leq 3$, $0<b\leq 4$, and when a is 1, 2, or 3, b is an integer);

providing a composite comprising: at least one second metal compound represented by Formula $Y_cO_d$ (where $0<c\leq 3$, $0<d<4$, and when c is 1, 2, or 3, d is not an integer); and graphene, wherein the at least one second metal compound is disposed in a graphene matrix; and mechanically milling the lithium transition metal oxide, the first metal compound, and the composite, wherein X or Y is each independently at least one metal selected from Groups 2 to 13, 15, and 16 of the Periodic Table of Elements.

Advantageous Effects

According to an aspect, a composite cathode active material includes a first shell including a first metal compound and a second shell including a second metal compound and graphene, and accordingly, a lithium battery including the composite cathode active material may improve cycle characteristics at low temperatures and high temperatures, improve high-speed charging characteristics, and suppress a side reaction between the composite cathode active material and an electrolyte solution.

DESCRIPTION OF DRAWING

FIG. 1 is a schematic view of a lithium battery according to an embodiment.

BEST MODE

Mode for Invention

The present inventive concept described hereinbelow may have various modifications and various embodiments, example embodiments will be illustrated in the drawings and more fully described in the detailed description. The present inventive concept may, however, should not be construed as limited to the example embodiments set forth herein, and rather, should be understood as covering all modifications, equivalents, or alternatives falling within the scope of the present inventive concept.

The terms used herein is for the purpose of describing particular embodiments only, and is not intended to be limiting the present inventive concept. An expression used in the singular encompasses the expression of the plural, unless it has a clearly different meaning in the context. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, "/" may be interpreted as "and", or as "or" depending on the context.

In the drawings, thicknesses may be magnified or exaggerated to clearly illustrate various layers and regions. Like reference numbers may refer to like elements throughout the drawings and the following description. It will be understood that when one element, layer, film, section, sheet, etc. is referred to as being "on" another element, it can be directly on the other element or intervening elements may be present therebetween.

The term "particle diameter" of particles as used herein refers to an average diameter of particles when the particles are spherical, and refers to an average major axis length of particles when the particles are non-spherical. The particle diameter of the particles may be measured using a particle size analyzer (PSA). The "particle diameter' of the particles may refer to, for example, an average particle diameter. The average particle diameter may be, for example, a median particle diameter (D50). The median particle diameter D50 is a particle size corresponding to a 50% cumulative volume calculated from particles having a small particle size in a particle size distribution measured by, for example, a laser diffraction method. For example, D10 is a particle size corresponding to a 10% cumulative volume calculated from particles having a small particle size in a particle size distribution measured by, for example, a laser diffraction method. For example, D90 is a particle size corresponding to a 90% cumulative volume calculated from particles having a small particle size in a particle size distribution measured by, for example, a laser diffraction method.

Hereinafter, according to example embodiments, a composite cathode active material, a cathode and a lithium battery that include the composite cathode active material, and a method of preparing the composite cathode active material will be further described in detail.

A composite cathode active material includes: a core; and a first shell and a second shell that are disposed on an outer side of a surface of the core. The first shell may include at least one first metal compound represented by Formula $X_aO_b$ (where $0<a\leq3$, $0<b\leq4$, and when a is 1, 2, or 3, b may be an integer) or Formula $X_a(OH)_b$ (where $0<a\leq3$, $0<b\leq4$, and when a is 1, 2, or 3, b may be an integer). The second shell may include: at least one second metal compound represented by Formula $Y_CO_d$ (where $0<c\leq3$, $0<d<4$, and when c is 1, 2, or 3, d may not be an integer); and graphene, wherein the at least one second metal oxide may be disposed in a graphene matrix, and X and Y may each independently be at least one metal selected from Groups 2 to 13, 15, and 16 of the Periodic Table of Elements.

Hereinafter, a theoretical basis for providing an excellent effect of a composite cathode active material according to an embodiment will be described, but the theoretical basis is to help understanding of the present inventive concept and is not intended to limit the present inventive concept in any way.

The composite cathode active material may include the first shell and the second shell that are disposed on the outer side of the surface of the core including a lithium transition metal oxide, wherein the first shell may include a first metal compound, and the second shell may include a second metal compound and graphene. In a composite cathode active material in the art, the cathode electrolyte interphase (CEI) is rapidly formed on a surface of the composite cathode active material due to side reactions between the composite cathode active material and an electrolyte solution during charging and discharging at a high voltage, thereby rapidly increasing the interface resistance between the composite cathode active material and the electrolyte solution. Accordingly, the internal resistance of a lithium battery including the composite cathode active material in the related art is increased, thereby rapidly degrading the electrochemical charging and discharging performance of the lithium battery. In contrast, the composite cathode active material disclosed herein in which the first shell including the first metal compound and the second shell including the second metal compound and graphene are disposed on the outer side of the surface of the core may effectively block the contact between the core and an electrolyte solution, and accordingly, a side reaction caused by the contact between the core and an electrolyte may be prevented. In addition, as the cation mixing caused by a side reaction between a transition metal cation of the composite cathode active material and an electrolyte solution is suppressed, the generation of a resistance layer on the surface of the composite cathode active material may be suppressed. In addition, the elution of transition metal ions from the surface of the composite cathode active material to the electrolyte solution may be suppressed. Consequently, the performance degradation of a lithium battery including the composite cathode active material may be suppressed.

In detail, as the first metal included in the first shell stabilizes the transition metal included in the core, the elution of the transition metal may be suppressed. In addition, the graphene included in the second shell may prevent the release of oxygen included in the core. Therefore, due to a double-shell structure including the first shell and the second shell, the elution of the transition metal and oxygen from the core may be suppressed. Also, since the graphene included in the second shell has high electronic conductivity, the interfacial resistance between the composite cathode active material and an electrolyte solution may be reduced. Consequently, the high-speed charging characteristics of a lithium battery including the composite cathode active material may be improved. Also, since the first metal compound and the second metal compound have voltage resistance, the deterioration of the lithium transition metal oxide included in the core may be prevented during charging and discharging at a high voltage. Consequently, the high-temperature and/or high-voltage cycle characteristics of a lithium battery including the composite cathode active material may be improved.

Regarding the first shell and the second shell that are disposed on the outer side of the surface of the core, for example, the first shell and the second shell may be sequentially disposed on the outer side of the surface of the core. The first metal compound included in the first shell may further stabilize the transition metal included in the core as the first metal compound is closer to the core, and the graphene may effectively reduce the interface resistance between the composite cathode active material and the electrolyte solution as the graphene is closer to the electrolyte solution. Consequently, as the first shell and the second shell are sequentially disposed on the outer side of the surface of the core, the cycle characteristics and high-speed charging characteristics of a lithium battery including the composite cathode active material may be further improved.

Regarding the first shell and the second shell that are disposed on the outer side of the surface of the core, for example, the first shell may be directly disposed on the outer side of the surface of the core, and the second shell may be directly disposed on the outer side of a surface of the first shell. Since the first shell is more adjacent to the core, the stabilizing effect of the transition metal by the first metal compound included in the first shell may be further improved. In addition, since the second shell is directly disposed on the outer side of the surface of the first shell, a double-layer structure of the first shell and the second shell may be formed. Due to the double-layer structure, an effect of preventing the elution of the transition metal and oxygen from the core may be further improved. In addition, as the second shell is disposed on the outer side of the surface of the first shell, the interfacial resistance between the composite cathode active material and the electrolyte solution may be further reduced. Consequently, as the first shell is directly disposed on the outer side of the surface of the core and the second shell is directly disposed on the outer side of the surface of the first shell, the cycle characteristics of a lithium battery including the composite cathode material may be further improved.

A thickness of the first shell included in the composite cathode active material may be, for example, in a range of about 1 nm to about 2 μm, about 10 nm to about 20 μm, about 50 nm to about 20 μm, about 100 nm to about 20 μm, about 200 nm to about 20 μm, about 500 nm to about 20 μm, about 1 μm to about 20 μm, about 2 μm to about 20 μm, about 5 μm to about 20 μm, about 1 nm to about 10 μm, about 1 nm to about 5 μm, about 1 nm to about 1 μm, about 1 nm to about 500 nm, about 1 nm to about 200 nm, about 1 nm to about 100 nm, or about 1 nm to about 50 nm. When the thickness of the first shell is within the ranges above, an effect of preventing the elution of the transition metal from the core may be further improved. Consequently, the cycle characteristics of a lithium battery including the composite cathode active material may be further improved.

A thickness of the second shell included in the composite cathode active material may be, for example, in a range of about 1 nm to about 2 μm, about 10 nm to about 20 μm, about 50 nm to about 20 μm, about 100 nm to about 20 μm, about 200 nm to about 20 μm, about 500 nm to about 20 μm, about 1 μm to about 20 μm, about 2 μm to about 20 μm, about 5 μm to about 20 μm, about 1 nm to about 10 μm, about 1 nm to about 5 μm, about 1 nm to about 1 μm, about 1 nm to about 500 nm, about 1 nm to about 200 nm, about 1 nm to about 100 nm, or about 1 nm to about 50 nm. When the thickness of the second shell is within the ranges above, an effect of preventing the elution of the transition metal from the core may be further improved, and accordingly, the cycle characteristics of a lithium battery including the composite cathode active material may be further improved. In addition, as the side reaction between the composite cathode active material and the electrolyte solution is suppressed, a rate of increasing the internal resistance of a lithium battery including the composite cathode active material may be further decreased.

A metal included in the first metal compound may be, for example, at least one selected from Al, Nb, Mg, Sc, Ti, Zr, V, W, Mn, Fe, Co, Pd, Cu, Ag, Zn, Sb, and Se. As the metal is included in the first metal compound, the first shell may be uniformly disposed on the outer side of the surface of the core. In addition, the stability of the transition metal included in the core may be further improved. Consequently, the elution of the transition metal from the composite cathode active material may be further effectively prevented. The first metal compound may include an oxide or hydroxide of the aforementioned metals.

The metal included in the first metal compound may be, for example, Al. The first metal compound may include, for example, at least one selected from the group consisting of $Al_2O_3$ and $Al(OH)_3$. The first metal compound may include, for example, both $Al_2O_3$ and $Al(OH)_3$. As the first shell includes such a first metal compound, the stability of the transition metal (e.g., cobalt (Co)) included in the core may be further improved. Consequently, the elution of the transition metal from the composite cathode active material may be further effectively prevented.

In the composite cathode active material, for example, the first metal compound included in the first shell and the transition metal of in the lithium transition metal oxide included in the core may be chemically bound via a chemical bond. As the first metal compound included in the first shell and the lithium transition metal oxide included in the core are chemically bound via a chemical bond, the core and the first shell included in shell may form a composite. In this regard, such a composite may be distinguished from a simple physical mixture of the first metal compound and the lithium transition metal oxide. In addition, as the stability of the transition metal included in the core is improved, the elution of the transition metal may be effectively suppressed.

An average particle diameter of the first metal compound included in the first shell may be, for example, in a range of about 10 nm to about 20 μm, about 50 nm to about 20 μm, about 100 nm to about 20 μm, about 150 nm to about 20 μm, about 1 nm to about 10 μm, about 1 nm to about 1 μm, about 1 nm to about 500 nm, about 1 nm to about 400 nm, about 1 nm to about 300 nm, or about 1 nm to about 200 nm. As the average particle diameter of the first metal compound is within the ranges above, the first metal compound may be uniformly disposed on the outer side of the surface of the core to form the first shell. Accordingly, due to the first shell uniformly disposed on the outer side of the surface of the core, the elution of the transition metal may be further effectively suppressed. Consequently, the cycle characteristics of a lithium battery including the composite cathode active material may be further improved.

The average particle diameter of the first metal compound may be measured by, for example, a measurement apparatus using a laser diffraction method or a dynamic light scattering method. The average particle diameter may be measured by using, for example, a laser scattering particle size distribution meter (e.g., LA-920 of Horiba Ltd.), and is a value of the median particle diameter D50 when the metal oxide particles are accumulated to 50% from small particles in volume conversion.

A metal included in the second metal compound may be, for example, at least one selected from Al, Nb, Mg, Sc, Ti, Zr, V, W, Mn, Fe, Co, Pd, Cu, Ag, Zn, Sb, and Se. The second metal compound may be, for example, at least one selected from $Al_2O_z$(where $0<z<3$), $NbO_x$ (where $0<x<2.5$), $MgO_x$ (where $0<x<1$), $Sc_2O_z$ (where $0<z<3$), $TiO_y$ (where $0<y<2$), $ZrO_y$ (where $0<y<2$), $V_2O_z$(where $0<z<3$), $WO_y$ (where $0<y<2$), $MnO_y$ (where $0<y<2$), $Fe_2O_z$ (where $0<z<3$), $Co_3O_w$ (where $0<w<4$), $PdO_x$ (where $0<x<1$), $CuO_x$ (where $0<x<1$), $AgO_x$ (where $0<x<1$), $ZnO_x$ (where $0<x<1$), $Sb_2O_z$ (where $0<z<3$), and $SeO_y$ (where $0<y<2$). As the second metal compound is disposed in a graphene matrix, the uniformity of the second shell disposed on the core and the first shell may be improved, and the voltage resistance of the composite cathode active material may be further improved. For example, the second shell may include, as the second metal compound, $Al_2O_x$ (where $0<x<3$).

The second shell may further include at least one third metal compound represented by Formula $Y_cO_e$ (where $0<c\leq3$, $0<e\leq4$, and when c is 1, 2, or 3, e may be an integer). Here, Y may be at least one metal selected from Groups 2 to 13, 15, and 16 of the Periodic Table of Elements. For example, the third metal compound may include the same metal as the second metal compound, and a ratio e/c, i.e., a ratio of e to c of the third metal compound, may be greater than a ratio d/c, i.e., a ratio of d to c of the second metal oxide. For example, e/c>d/c. The third metal compound may be, for example, selected from $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $CoaO_4$, PdO, CuO, AgO, ZnO, $Sb_2O_3$, and $SeO_2$. The second metal compound may be a reduction product of the third metal compound. The second metal compound may be obtained by partial or full reduction of the third metal compound. Accordingly, the second metal compound may have a lower oxygen content and a greater oxidation number than the third metal compound. For example, the second shell may include $Al_2O_x$ (where $0<x<3$) as the second metal oxide and $Al_2O_3$ as the third metal compound.

In the composite cathode active material, for example, the graphene included in the second shell and the metal of the first metal compound included in the first shell may be chemically bound via a chemical bond. A carbon atom (C) of the graphene included in the second shell and the transition metal (Me) of the first metal compound included in the first shell may be, for example, chemically bound via an oxygen atom-mediated C—O-Me bond (e.g., a C—O—Co bond). As the graphene included in the second shell and the first metal compound included in the first shell are chemically bound via a chemical bond, the first shell and the second shell may form a composite. In addition, as described above, when the first metal compound included in the first shell and the lithium transition metal oxide included in the core are chemically bound via a chemical bond, the core and the first shell may form a composite. Consequently, the core, the first shell, and the second shell form a composite. In this regard, such a composite may be distinguished from a simple physical mixture of the first metal compound, the second metal compound, the graphene, and the lithium transition metal oxide.

In addition, the second metal compound included in the second shell and the graphene may be also chemically bound via a chemical bond. Here, the chemical bond may be, for example, a covalent bond or an ionic bond. The covalent bond may be, for example, a bond including at least one of an ester group, an ether group, a carbonyl group, an amide group, a carbonate anhydride group, and an acid anhydride group. The ionic bond may be, for example, a bond including a carboxylic acid ion, an ammonium ion, an acyl cation group, and the like.

The composite cathode active material may, for example, further include a fourth metal doped on the core. For example, after the surface of the lithium transition metal oxide included in the core is doped with the fourth metal, the first shell and the second shell may be disposed on the outer side of the surface of the core. The fourth metal may include, for example, at least one of Al, Zr, W, and Co.

The second shell included in the composite cathode active material may include, for example, at least one selected from: a composite including the second metal compound and the graphene; and a milling result of the composite, wherein the second metal compound may be disposed in a graphene matrix. The second shell may be, for example, prepared by a composite of the second metal compound and the graphene. The composite may further include a third metal compound in addition to the second metal compound. The composite may include, for example, at least two types of the second metal compound. The composite may include, for example, at least two types of the second metal compound and at least two types of the third metal compound.

An average particle diameter of at least one selected from the second metal compound and the third metal compound included in the composite may be in a range of about 1 nm to about 1 μm, about 1 nm to about 500 nm, about 1 nm to about 200 nm, about 1 nm to about 100 nm, about 1 nm to about 70 nm, about 1 nm to about 50 nm, about 1 nm to about 30 nm, about 3 nm to about 1 μm, about 5 nm to about 1 μm, about 10 nm to about 1 μm, about 15 nm to about 1 μm, about 20 nm to about 1 μm, about 25 nm to about 1 μm, or about 30 nm to about 1 μm. As the second metal compound and/or the third metal compound has a particle diameter within the nanometer ranges above, the second metal compound and/or the third metal compound may be further uniformly distributed in a graphene matrix of the composite. Accordingly, the composite may be then uniformly coated on the core and the outer side of the surface of the first shell to form the second shell. As the second metal compound and/or the third metal compound has a particle diameter within the ranges above, the second metal compound and/or the third metal compound may be further uniformly disposed on the core and the outer side of the surface of the first shell. Therefore, by uniformly disposing the second metal compound and/or the third metal compound on the core and the outer side of the surface of the first shell, the voltage resistance characteristics of a lithium battery including the composite may be further effectively exhibited.

An average particle diameter of each of the second metal compound and the third metal compound may be measured in the same way as the average particle diameter of the first metal compound.

The uniformity deviation of at least one selected from the second metal compound and the third metal compound included in the composite may be less than or equal to 3%, less than or equal to 2%, or less than or equal to 1%. The uniformity may be obtained by, for example, XPS. Accordingly, at least one selected from the second metal compound and the third metal compound may be uniformly distributed in the composite with the deviation of less than or equal to 3%, less than or equal to 2%, or less than or equal to 1%.

The graphene included in the composite may have, for example, a branched structure, and the second metal compound may be distributed in the branched structure of the graphene. The graphene included in the composite may have, for example, a branched structure, and the second metal compound and the third metal compound may be distributed in the branched structure of the graphene. The branched structure of the graphene may include, for example, a plurality of graphene particles in contact with one another. Since the graphene has such a branched structure, various conducting paths may be provided.

The graphene included in the composite may have, for example, a spherical structure, and the second metal compound may be distributed in the spherical structure of the graphene. The graphene included in the composite may have, for example, a spherical structure, and the second metal compound and the third metal compound may be distributed in the spherical structure of the graphene. The spherical structure of the graphene may have a size in a range of 50 nm to 300 nm. A plurality of graphenes having the spherical structure may be provided. When the graphene has such a spherical structure, the composite may have a rigid structure.

The graphene included in the composite may have, for example, a spiral structure in which a plurality of spherical structures are connected to each other, and the second metal compound may be distributed in the spherical structures of the spiral structure. The graphene included in the composite may have, for example, a spiral structure in which a plurality of spherical structures are connected to each other, and at least one metal compound selected from the second metal compound and the third metal compound may be distributed in the spherical structures of the spiral structure. The spiral structure of the graphene may have a size in a range of 500 nm to 100 μm. Since the graphene has such a spiral structure, the composite may have a rigid structure.

The graphene included in the composite may have, for example, a cluster structure in which a plurality of spherical structures are connected to each other, and the second metal compound may be distributed in the spherical structures of the cluster structure. The graphene included in the composite may have, for example, a cluster structure in which a plurality of spherical structures are connected to each other, and the second metal compound and the third metal compound may be distributed in the spherical structures of the cluster structure. The cluster structure of the graphene may have a size in a range of 0.5 mm to 10 cm. Since the graphene has such a cluster structure, the composite may have a rigid structure.

The composite may have, for example, a crumpled faceted-ball structure, and the second metal oxide may be distributed inside or on the surface of this structure. The composite may have, for example, a crumpled faceted-ball structure, and the second metal compound and the third metal compound may be distributed inside or on the surface of this structure. Since the composite has such a faceted-ball structure, the composite may be easily coated on the irregular surface uneveness of the core.

The composite may have, for example, a planar structure, and the second metal compound may be distributed inside or on the surface of this structure. The composite may have, for example, a planar structure, and at least one selected from the second metal compound and the third metal compound may be distributed inside or on the surface of the structure. Since the composite has such a two-dimensional planar structure, the composite may be easily coated on the irregular unevenness of the core surface.

The graphene included in the composite may extend from the second metal compound by a distance of less than or equal to about 10 nm, and may include at least 1 to 20 graphene layers. For example, when a plurality of graphene layers are laminated, graphene having a total thickness of less than or equal to about 12 nm may be disposed on the second metal compound. For example, the total thickness of graphene may be in a range of about 0.6 nm to about 12 nm.

The sum of the weight of the first metal compound, the weight of the second metal compound, and the weight of the graphene may be, based on the weight of the core, in a range of about 0.001 wt % to about 1 wt %, about 0.005 wt % to about 1 wt %, about 0.001 wt % to about 1 wt %, about 0.01 wt % to about 1 wt %, about 0.02 wt % to about 1 wt %, about 0.05 wt % to about 1 wt %, about 0.1 wt % to about 1 wt %, about 0.001 wt % to about 0.5 wt %, about 0.001 wt % to about 0.2 wt %, about 0.001 wt % to about 0.15 wt %, or about 0.001 wt % to about 0.1 wt %. When the composite cathode active material includes the composite within the ranges above, the cycle characteristics of a lithium battery including the composite cathode active material may be further improved.

The core included in the composite cathode active material may include, for example, a lithium transition metal oxide represented by Formula 1:

$$Li_{a1}CO_{x1}M_{y1}O_{2-b1}A_{b1} \quad \text{Formula 1}$$

wherein, in Formula 1, $1.0 \le a1 \le 1.2$, $0 \le b1 \le 0.2$, $0.9 \le x1 \le 1$, $0 \le y1 \le 0.1$, and $x1+y1=1$, and M may be manganese (Mn), cobalt (Co), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A may be F, S, Cl, Br, or a combination thereof.

The core included in the composite cathode active material may include, for example, a lithium transition metal oxide represented by Formula 2:

$$LiCoO_2. \quad \text{Formula 2}$$

Another aspect provides a cathode including the composite cathode active material. By including the composite cathode active material, the cathode may provide improved cycle characteristics and increased thermal stability.

The cathode may be, for example, prepared according to the following method, but the preparation method thereof is not necessarily limited to the exemplified method and may be adjusted to required conditions.

First, a cathode active material composition is prepared by mixing the aforementioned composite cathode active material, a conductive material, a binder, and a solvent. The prepared cathode active material composition may be directly coated and dried on an aluminum current collector to form a cathode plate provided with a cathode active material layer. Alternatively, a film obtained by casting the cathode active material composition on a separate support and separating it from the support may be laminated on an aluminum current collector to prepare a cathode plate on which the cathode active material layer is formed.

Examples of the conductive material may be: carbon black, graphite particulates, natural graphite, artificial graphite, acetylene black, Ketjen black, carbon fibers; carbon nanotubes; metallic powder, metallic fiber, or metallic tube of copper, nickel, aluminum, silver, and the like; and a conductive polymer such as a polyphenylene derivative. However, embodiments are not limited thereto, and any suitable conductive material available in the art may be used.

Examples of the binder are a vinylidene fluoride/hexafluoropropylene copolymer, polyvinylidene fluoride, polyacrylonitrile, polymethyl methacrylate, polytetrafluoroethylene (PTFE), a mixture of the aforementioned polymers, a styrene butadiene-rubber polymer, and the like, and examples of the solvent are N-methyl pyrrolidone (NMP), acetone, water, and the like. However, embodiments are not limited thereto, and any suitable binder and solvent available in the art may be used.

By further adding a plasticizer or a pore former to the cathode active material composition, pores may be formed inside an electrode plate.

The contents of the composite cathode active material, the conductive material, the binder, and the solvent used in the cathode may be at levels general for use in a lithium battery. Depending on the use and configuration of a lithium battery, one or more of the conductive material, the binder, and the solvent may be omitted.

In addition, the cathode may additionally include a general cathode active material other than the aforementioned composite cathode active material.

As the general cathode active material, any suitable lithium-containing metal oxide available in the art may be used without limitation. For example, at least one composite oxide consisting of lithium and a metal selected from Co, Mg, Ni, and a combination thereof may be used, and a specific example thereof is a compound represented by one of the following formulae: $Li_{a1}A_{1-b1}B_{b1}D_2$ (where $0.90 \leq a1 \leq 1$ and $0 \leq b1 \leq 0.5$); $Li_{a1}E_{1-b1}B_{b1}O_{2-c1}D_{c1}$ (where $0.90 \leq a1 \leq 1$, $0 \leq b1 \leq 0.5$, and $0 \leq c1 \leq 0.05$); $LiE_{2-b1}B_{b1}O_{4-c1}D_{c1}$ (where $0 \leq b1 \leq 0.5$ and $0 \leq c1 \leq 0.05$); $Li_{a1}Ni_{1-b1-c1}Co_{b1}B_{c1}D_{\alpha}$ (where $0.90 \leq a1 \leq 1$, $0 \leq b1 \leq 0.5$, $0 \leq c1 \leq 0.05$, and $0 < \alpha \leq 2$); $Li_{a1}Ni_{1-b1-c1}Co_{b1}B_{c1}O_{2-\alpha}F_{\alpha}$ (where $0.90 \leq a1 \leq 1$, $0 \leq b1 \leq 0.5$, $0 \leq c1 \leq 0.05$, and $0 < \alpha < 2$); $Li_{a1}Ni_{1-b1-c1}Co_{b1}B_{c1}O_{2-\alpha}F_2$ (where $0.90 \leq a1 \leq 1$, $0 \leq b1 \leq 0.5$, $0 \leq c1 \leq 0.05$, and $0 < \alpha < 2$); $Li_{a1}Ni_{1-b1-c1}Mn_{b1}B_{c1}D_{\alpha}$ (where $0.90 \leq a1 \leq 1$, $0 \leq b1 \leq 0.5$, $0 \leq c1 \leq 0.05$, and $0 < \alpha \leq 2$); $Li_{a1}Ni_{1-b1-c1}Mn_{b1}B_{c1}O_{2-\alpha}F_{\alpha}$ (where $0.90 \leq a1 \leq 1$, $0 \leq b1 \leq 0.5$, $0 \leq c1 \leq 0.05$, and $0 < \alpha < 2$); $Li_{a1}Ni_{1-b1-c1}Mn_{b1}B_{c1}O_{2-\alpha}F_2$ (where $0.90 \leq a1 \leq 1$, $0 \leq b1 \leq 0.5$, $0 \leq c1 \leq 0.05$, and $0 < \alpha < 2$); $Li_{a1}Ni_{b1}E_{c1}G_{d1}O_2$ (where $0.90 \leq a1 \leq 1$, $0 \leq b1 \leq 0.9$, $0 \leq c1 \leq 0.5$, and $0.001 \leq d1 \leq 0.1$); $Li_{a1}Ni_{b1}Co_{c1}Mn_{d1}G_{e1}O_2$ (where $0.90 \leq a1 \leq 1$, $0 \leq b1 \leq 0.9$, $0 \leq c1 \leq 0.5$, $0 \leq d1 \leq 0.5$, and $0.001 \leq e1 \leq 0.1$); $Li_{a1}NiG_{b1}O_2$ (where $0.90 \leq a1 \leq 1$ and $0.001 \leq b1 \leq 0.1$); $Li_{a1}CoG_{b1}O_2$ (where $0.90 \leq a1 \leq 1$ and $0.001 \leq b1 \leq 0.1$); $Li_{a1}MnG_{b1}O_2$ (where $0.90 \leq a1 \leq 1$ and $0.001 \leq b1 \leq 0.1$); $Li_{a1}Mn_2G_{b1}O_4$ (where $0.90 \leq a1 \leq 1$ and $0.001 \leq b1 \leq 0.1$); $QO_2$; $QS_2$; $LiQS_2$; $V_2O_5$; $LiV_2O_5$; $LiIO_2$; $LiNiVO_4$; $Li_{(3-f1)}J_2(PO_4)_3$ (where $0 \leq f1 \leq 2$); $Li_{(3-f1)}Fe_2(PO_4)_3$ (where $0 \leq f1 \leq 2$); and $LiFePO_4$.

In the formulae above representing the compound, A may be Ni, Co, Mn, or a combination thereof; B may be Al, Ni, Co, Mn, Cr, Fe, Mg, Sr, V, a rare earth element, or a combination thereof; D may be 0, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

A compound in which a coating layer is additionally provided on the surface of the aforementioned compound may be used, and a mixture of the aforementioned compound and a compound additionally provided with a coating layer may be also used. The coating layer additionally provided on the surface of the aforementioned compound may include, for example, a coating element compound such as oxide of a coating element, hydroxide of a coating element, oxyhydroxide of a coating element, oxycarbonate of a coating element, or hydroxycarbonate of a coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. A method of forming the coating layer may be selected within a range that does not adversely affect the physical properties of the cathode active material. The coating method may be, for example, spray coating, dipping method, or the like. A detailed description of the coating method will be omitted because it may be well understood by those in the art.

Another aspect provides a lithium battery including the cathode that includes the composite cathode active material.

When the lithium battery includes the cathode including the composite cathode active material, the improved cycle characteristics, improved high-speed charging, and improved thermal stability may be provided. In addition, as the CEI is formed between the cathode and the electrolyte solution during charging and discharging, an increase in the internal resistance in the lithium battery may be suppressed.

The lithium battery may be, for example, prepared according to the following method, but the preparation method thereof is not necessarily limited to the exemplified method and may be adjusted to required conditions.

First, a cathode is prepared according to the aforementioned preparation method of the cathode.

Next, an anode may be manufactured as follows. The anode may be, for example, prepared in the same manner as in the cathode, except that an anode active material is used instead of the composite cathode active material. In addition, in the anode active material composition, the substantially same conductive material, binder, and solvent used in the cathode preparation may be used.

For example, an anode active material, a conductive material, a binder, and a solvent may be mixed to prepare an anode active material composition. The anode active material composition may be then directly coated on a copper current collector to prepare an anode electrode plate. Alternatively, an anode active material film obtained by casting the anode active material composition on a separate support and separating it from the support may be laminated on a copper current collector to prepare an anode electrode plate.

As the anode active material, any suitable anode active material available in the art for a lithium battery may be used. For example, the anode active material may include at least one selected from lithium metal, a metal alloyable with lithium, a transition metal oxide, a non-transition metal oxide, and a carbon-based material.

Examples of the metal alloyable with lithium are silicon (Si), tin (Sn), aluminum (Al), germanium (Ge), lead (Pb), bismuth (Bi), antimony (Sb), a Si—Y alloy (where Y is an alkali metal, an alkaline earth metal, a Group 13 element, a Group 14 element, a transition metal, a rare earth element, or a combination thereof, and Y is not Si), and a Sn—Y alloy (where Y is an alkali metal, an alkaline earth-metal, a Group 13 element, a Group 14 element, a transition metal, a rare earth element, or a combination thereof, and Y is not Sn). The element Y may be, for example, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, $O_5$, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include, for example, a lithium titanium oxide, a vanadium oxide, a lithium vanadium oxide, and the like.

The non-transition metal oxide may be, for example, $SnO_2$, SiOx (where $0<x<2$), and the like.

The carbon-based material may be, for example, crystalline carbon, amorphous carbon, or a mixture thereof. The crystalline carbon may be, for example, amorphous, plate-like, flake-like, spherical, or fibrous graphite, such as natural graphite or artificial graphite. The amorphous carbon may be, for example, soft carbon (carbon sintered at a low temperature) or hard carbon, mesophase pitch carbide, sintered coke, and the like.

The contents of the anode active material, the conductive material, the binder, and the solvent may be at levels general for use in a lithium battery. Depending on the use and configuration of a lithium battery, one or more of the conductive material, the binder, and the solvent may be omitted.

Next, a separator to be disposed between the cathode and the anode is prepared.

The separator may be any suitable separator commonly used in a lithium battery. The separator may have, for example, low resistance to migration of ions in an electrolyte and have electrolyte solution-retaining ability. The separator may be, for example, glass fiber, polyester, Teflon, polyethylene, polypropylene, polytetrafluoroethylene (PTFE), and a combination thereof, each of which may be in a non-woven fabric form or a woven fabric form. For a lithium-ion battery, a rollable separator including, for example, polyethylene or polypropylene may be used. A separator with a good organic electrolyte solution-retaining ability may be used for a lithium-ion polymer battery.

The separator may be, for example, prepared according to the following example method, but embodiments are not limited thereto, and the method may be controlled according to the required conditions.

First, a separator composition is prepared by mixing a polymer resin, a filler, and a solvent. Then, the separator composition is directly coated on a electrode, and then dried to form a separator. Alternatively, a separator film obtained by casting the separator composition on a support, drying, and separating it from the support may be laminated on an electrode to form a separator.

The polymer used in the separator preparation is not particularly limited, and any suitable polymer avilable as a binder for an electrode plate may be used. For example, a vinylidenefluoride/hexafluoropropylene copolymer, polyvinylidene fluoride (PVDF), polyacrylonitrile, polymethylmethacrylate, or a mixture thereof may be used.

Next, an electrolyte may is prepared.

The electrolyte may be, for example, an organic electrolyte solution. The organic electrolyte solution may be, for example, prepared by dissolving a lithium salt in an organic solvent.

For use as the organic solvent, any suitable organic solvent available in the art may be used. Examples of the organic solvent are propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolan, 4-methyl dioxolan, N, N-dimethyl formamide, dimethyl acetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

For use as the lithium salt, any material available in the art as a lithium salt may be used. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$(where x and y may each be a natural number), LiCl, LiI, or a mixture thereof.

Alternatively, the electrolyte may be a solid electrolyte. The solid electrolyte may be, for example, boron oxide, lithium oxynitride, and the like, but embodiments are not limited thereto. Any suitable solid electrolyte available in the art may be used. The solid electrolyte may be formed on the anode by a method such as sputtering, or a separate solid electrolyte sheet may be laminated on the anode.

As shown in FIG. 1, a lithium battery 1 includes a cathode 3, an anode 2, and a separator 4. The cathode 3, the anode 2, and the separator 4 may be wound or folded to be accommodated in a battery case 5. Then, the battery case 5 may be filled with an organic electrolyte solution, and sealed with a cap assembly 6, thereby completing the manufacture of the lithium battery 1. The battery case 5 may be cylindrical, but the shape of the battery case 5 is not necessarily limited thereto. For example, the battery case 5 may be a square-type, a thin-film type, or the like.

The pouch-type lithium battery may include at least one battery assembly. The separator 4 may be disposed between the cathode 3 and the anode 2 to form a battery assembly. The battery assembly may be laminated as a bi-cell structure, impregnated with an organic electrolyte solution, and accommodated and sealed in a pouch to complete the manufacture of a pouch-type lithium battery. Multiple battery assemblies are stacked to form a battery pack, and the battery pack may be used in all types of devices requiring high capacity and high output. For example, the battery pack may be used in a laptop computer, a smart phone, an electronic vehicle, or the like.

Since the lithium battery has excellent lifespan characteristics and excellent high-rate characteristics, the lithium battery may be used in, for example, an electric vehicle (EV). For example, the lithium battery may be used in a hybrid vehicle, such as a plug-in hybrid electric vehicle (PHEV). In addition, the lithium battery may be applicable to the fields requiring high-power storage. For example, the lithium battery may be used in a electric bicycle, a power tool, or the like.

Another aspect provides a method of preparing a composite cathode active material, the method including: providing a lithium transition metal oxide; providing at least one first metal compound represented by Formula $X_aO_b$ (where $0<a\leq3$, $0<b\leq4$, and when a is 1, 2, or 3, b may be an integer) or Formula $X_a(OH)_b$ (where $0<a\leq3$, $0<b\leq4$, and when a is 1, 2, or 3, b may be an integer); providing a composite including: at least one second metal compound represented by Formula $Y_cO_d$ (where $0<c\leq3$, $0<d<4$, and when c is 1, 2, or 3, d may not be an integer); and graphene, wherein the second metal compound is disposed in a graphene matrix; and mechanically milling the lithium transition metal oxide, the first metal compound, and the composite, wherein X or Y may each independently be at least one metal selected from Groups 2 to 13, 15, and 16 of the Periodic Table of Elements.

Then, a lithium transition metal oxide may be provided. The lithium transition metal oxide may be, for example, the compound represented by Formula 1 or 2.

In the providing of at least one first metal compound represented by Formula $X_aO_b$ (where $0<a\leq3$, $0<b\leq4$, and when a is 1, 2, or 3, b may be an integer) or Formula $X_a(OH)_b$ (where $0<a\leq3$, $0<b\leq4$, and when a is 1, 2, or 3, b may be an integer), the at least one first metal compound may be mixed with the lithium transition metal oxide.

The first metal compound may include, for example, at least one metal selected from Al, Nb, Mg, Sc, Ti, Zr, V, W, Mn, Fe, Co, Pd, Cu, Ag, Zn, Sb, and Se as described above. The first metal compound may include, for example, Al. The first metal compound may include, for example, at least one selected from the group consisting of $Al_2O_3$ and $Al(OH)_3$. The first metal compound may include, for example, both $Al_2O_3$ and $Al(OH)_3$.

The providing of a composite including: at least one second metal compound represented by Formula $Y_cO_d$ (where $0<c\leq3$, $0<d<4$, and when c is 1, 2, or 3, d may not be an integer); and graphene, and disposed in a graphene matrix may include, for example, supplying reaction gas consisting of carbon supply source to a structure including the third metal compound and performing heat treatment thereon.

The providing of the composite may include, for example, supplying reaction gas consisting of carbon supply source gas to at least one third metal oxide represented by $Y_cO_e$ (where 0<c≤3, 0<e≤4, and when c may be 1, 2, or 3, 3 may be an integer) and performing heat treatment thereon, wherein Y may be at least one metal selected from Groups 2 to 13, 15, and 16 of the Periodic Table of Elements.

The carbon supply source gas may be mixed gas in which at least one selected from the group consisting of a compound represented by Formula 3, a compound represented by Formula 4, and oxygen-containing gas represented by Formula 5:

$$C_nH_{(2n+2-a2)}[OH]_{a2} \qquad \text{Formula 3}$$

wherein, in Formula 3, n may be an integer from 1 to 20, and a2 may be 0 or 1;

$$C_nH_{2n} \qquad \text{Formula 4}$$

wherein, in Formula 4, n may be an integer from 2 to 6; and $$C_{x2}H_{y2}O_{z2} \qquad \text{Formula 5}$$

wherein, in Formula 5, x2 may be 0 or an integer from 1 to 20, y may be 0 or an integer from 1 to 20, and z may be 1 or 2.

The compound represented by Formula 3 and the compound represented by Formula 4 may be at least one selected from the group consisting of methane, ethylene, propylene, methanol, ethanol, and propanol. The oxygen-containing gas represented by Formula 5 may include, for example, carbon dioxide ($CO_2$), carbon monoxide (CO), water vapor ($H_2O$), or a mixture thereof.

Following the providing of the reaction gas consisting of the carbon supply source to the third metal compound represented by $Y_e$(where 0<c≤3, 0<e≤4, and when c is 1, 2, or 3, e may be an integer) and performing heat-treating thereon, a cooling process may be further performed by using at least one inert gas selected from the group consisting of nitrogen, helium, and argon. The cooling process refers to adjusting the reaction temperature to room temperature (20° C. to 25° C.). The carbon supply source gas may include at least one inert gas selected from the group consisting of nitrogen, helium, and argon.

In the preparation method of the composite, a process of growing the graphene may be performed under various conditions depending on a gas reaction.

According to a first condition, for example, methane may be provided first to a reactor in which the third metal oxide represented by $Y_cO_e$ (where 0<c≤3 and 0<3≤4, and when c is 1, 2, or 3, e may be an integer) is disposed, and the reaction temperature may be raised to a heat treatment temperature T. The time required for raising the reaction temperature to the heat treatment temperature T may be in a range of 10 minutes to 4 hours, and the heat treatment temperature T may be in a range of 700° C. to 1100° C. The heat treatment may be performed during the reaction time at the heat treatment temperature T. The reaction time may be, for example, in a range of 4 hours to 8 hours. The heat-treated product may be cooled to room temperature to prepare a composite. The time required for lowering the reaction temperature from the heat treatment temperature T to the room temperature may be, for example, in a range of 1 hour to 5 hours.

According to a second, for example, hydrogen may be provided first to a reactor in which the third metal oxide represented by $Y_cO_e$ (where 0<c≤3 and 0<3≤4, and when c is 1, 2, or 3, e may be an integer) is disposed, and the reaction temperature may be raised to a heat treatment temperature T. The time required for raising the reaction temperature to the heat treatment temperature T may be in a range of 10 minutes to 4 hours, and the heat treatment temperature T may be in a range of 700° C. to 1100° C. After the heat treatment is performed at the heat treatment temperature T for a predetermined reaction time, methane gas may be supplied, and the heat-treatment may be performed for the residual reaction time. The reaction time may be, for example, in a range of 4 hours to 8 hours. The heat-treated product may be cooled to room temperature to prepare a composite. In the cooling process, nitrogen may be provided thereto. The time required for lowering the reaction temperature from the heat treatment temperature T to the room temperature may be, for example, in a range of 1 hour to 5 hours.

In the preparation of the composite, when the carbon supply source gas includes water vapor, the composite having excellent conductivity may be obtained. The content of water vapor in the gas mixture is not limited, and may be, for example, in a range of 0.01 vol % to 10 vol % based on 100 vol % of the total carbon supply source gas. The carbon supply source gas may be: for example, methane; mixed gas including methane and inert gas; or mixed gas including methane and oxygen-containing gas.

The carbon supply source gas may be: for example, methane; mixed gas including methane and carbon dioxide; or mixed gas including methane, carbon dioxide, and water vapor. A molar ratio of methane to carbon dioxide in the mixed gas of methane and carbon dioxide may be in a range of about 1:0.20 to about 1:0.50, about 1:0.25 to about 1:0.45, or about 1:0.30 to about 1:0.40. A molar ratio of methane to carbon dioxide and water vapor in the mixed gas of methane and carbon dioxide and water vapor may be in a range of about 1:0.20 to about 0.50:0.01 to 1.45, about 1:0.25 to about 0.45:0.10 to 1.35, or about 1:0.30 to about 0.40:0.50 to 1.0.

The carbon supply source gas may be, for example, carbon monoxide or carbon dioxide. The carbon supply source gas may be, for example, mixed gas of methane and nitrogen. A molar ratio of methane to nitrogen in the mixed gas of methane and nitrogen may be in a range of about 1:0.20 to about 1:0.50, about 1:0.25 to about 1:0.45, or about 1:0.30 to about 1:0.40. The carbon supply source gas may not include inert gas such as nitrogen.

The heat treatment pressure may be selected in consideration of the heat treatment temperature, the composition of the gas mixture, and the desired coating amount of carbon. The heat treatment pressure may be controlled by adjusting the amount of the inflowing gas mixture and the amount of the outflowing gas mixture. The heat treatment pressure may be, for example, greater than or equal to 0.5 atm, greater than or equal to 1 atm, greater than or equal to 2 atm, greater than or equal to 3 atm, greater than or equal to 4 atm, or greater than or equal to 5 atm.

The time for the heat treatment time is not particularly limited, and may be selected in consideration of the heat treatment temperature, the heat treatment pressure, the composition of the gas mixture, and the desired coating amount of carbon. For example, the reaction time at the heat treatment temperature may be, for example, in a range of 10 minutes to 100 hours, 30 minutes to 90 hours, or 50 minutes to 40 hours. For example, as the time for the heat treatment increases, an amount of graphene (e.g., carbon) deposited increases, and thus the electrical properties of the composite may be improved. However, such a trend may not necessarily be directly proportional to the time. For example, after a predetermined period of time, the deposition of graphene may no longer occur, or the deposition rate of graphene may be lowered.

Through a gas phase reaction of the aforementioned carbon supply source gas, even at a relatively low temperature, a composite may be obtained by providing uniform graphene coating on at least one selected from the third metal compound represented by $Y_cO_e$ (where 0<c≤3, 0<e≤4, and when c is 1, 2, or 3, e may be an integer) and the second metal compound that is a reduction product of the third metal compound and represented by $Y_cO_d$ (where 0<c≤3, 0<d<4, and when c is 1, 2, or 3, d may be an integer).

The composite may include: for example, the graphene matrix having at least one structure selected from a spherical structure, a spiral structure in which a plurality of spherical structures are connected, a cluster structure in which a plurality of spherical structures are aggregated, and a sponge structure; and at least one selected from second metal compound represented by $Y_cO_d$ (where 0<c≤3, 0<d<4, and when c is 1, 2, or 3, d may not be an integer) and the third metal compound represented by $Y_cO_e$ (where 0<c≤3, 0<e≤4, and when c is 1, 2, or 3, e may be an integer) disposed in the graphene matrix.

Next, the lithium transition metal oxide, the first metal compound, and the composite may be mixed and mechanically milled. For the milling, a Nobilta mixer or the like may be used. The number of revolutions of the mixer during milling may be, for example, in a range of 1,000 rpm to 2,500 rpm. When the milling speed is less than 1,000 rpm, the shear force applied to the lithium transition metal oxide, the first metal compound, and the composite is weak, and thus a chemical bond may be difficult to form among the lithium transition metal oxide, the first metal compound, and the composite. When the milling speed is excessively high, the formation of a composite proceeds in an excessively short time, and thus it may be difficult to form a uniform and continuous first shell by uniformly coating the lithium transition metal oxide with the first metal compound, and to form a uniform and continuous second shell by uniformly coating the lithium transition metal oxide with the composite. The milling time may be, for example, in a range of 5 minutes to 100 minutes, 5 minutes to 60 minutes, or 5 minutes to 30 minutes. When the milling time is too short, it may be difficult to form a uniform and continuous first shell by uniformly coating the lithium transition metal oxide with the first metal compound, and to form a uniform and continuous second shell by uniformly coating the lithium transition metal oxide with the composite. When the milling time is significantly long, the production efficiency may decrease.

The sum of the weight of the first metal compound, the weight of the second metal compound, and the weight of the graphene may be, as described above, in a range of about 0.001 wt % to about 1 wt % based on the weight of the core.

The average particle diameter of the first metal compound may be, as described above, in a range of about 1 nm to about 200 μm. The average particle diameter D50 of the composite used for the mechanical milling of the lithium transition metal oxide and the composite may be, for example, in a range of 1 μm to 20 μm, 3 μm to 15 μm, or 5 μm to 10 μm.

Exemplary embodiments will be described is in greater details through Examples and Comparative Examples below. However, these examples are provided to represent the technical idea, and the scope of the present technical idea is not limited thereto.

(Preparation of Composite)

$Al_2O_3$@Gr Composite $Al_2O_3$ particles (average particle diameter: about 20 nanometers (nm)) were placed in a reactor, and then the temperature inside the reactor was raised to 1,000° C. under the condition that $CH_4$ was supplied into the reactor at about 300 standard cubic centimeters per minute (sccm) and about 1 atmosphere (atm) for about 30 minutes.

Subsequently, heat treatment was performed thereon while maintaining the temperature same for 7 hours. Then, the temperature inside the reactor was adjusted to room temperature (20° C. to 25° C.) to obtain a composite in which $Al_2O_3$ particles and $Al_2O_z$ (where 0<z<3) particles as a reduction product thereof were embedded in graphene.

Here, the amount of graphene included in the composite was 30.9 wt %.

Gr (Graphene)

Graphene was obtained in the same manner as in Preparation Example 1, except that the $Al_2O_3$ particles were not placed in the reactor.

(Preparation of Composite Cathode Active Material)

Preparation Example 1: LCO 100 g (Core)/$Al(OH)_3$ 0.05 g (First Shell)/$Al_2O_3$@Gr Composite 0.05 g (Second Shell)

$LiCoO_2$ (hereinafter referred to as LCO) having a specific surface area of 0.21 $m^2/g$, $Al(OH)_3$ an average particle diameter of 200 nm, and the $Al_2O_3$@Gr composite were mixed by using a hand mixer for 5 minutes to obtain a composite cathode active material in which a composite coating layer of a first shell and a second shell is formed on the LCO surface.

Here, the weight ratio of LCO:$Al(OH)_3$:$Al_2O_3$@Gr composite was 100:0.05:0.05.

Preparation Example 2: LCO 100 g (Core)/$Al(OH)_3$ 0.05 g, $Al_2O_3$0.03 g (First Shell)/$Al_2O_3$@Gr Composite 0.02 g (Second Shell)

A composite cathode active material was prepared in the same manner as in Preparation Example 1, except that a weight ratio of LCO (specific surface area: 0.21 $m^2/g$), $Al(OH)_3$ (average particle diameter 200 nm), $Al_2O_3$ (average particle diameter: 20 nm), and the $Al_2O_3$@Gr composite was changed to 100:0.05:0.03:0.02.

Preparation Example 3: LCO 100 g (Core)/$Al(OH)_3$ 0.05 g, $Al_2O_3$0.07 g (First Shell)/$Al_2O_3$@Gr Composite 0.03 g (Second Shell)

A composite cathode active material was prepared in the same manner as in Preparation Example 1, except that a weight ratio of LCO (specific surface area: 2.21 $m^2/g$), $Al(OH)_3$ (average particle diameter 200 nm), $Al_2O_3$ (average particle diameter: 20 nm), and the $Al_2O_3$@Gr composite was changed to 100:0.05:0.07:0.03.

Preparation Example 4: LCO 100 g (Core)/$Al(OH)_3$ 0.07 g, $Al_2O_3$0.07 g (First Shell)/$Al_2O_3$@Gr Composite 0.06 g (Second Shell)

A composite cathode active material was prepared in the same manner as in Preparation Example 1, except that a weight ratio of LCO (specific surface area: 2.21 $m^2/g$), $Al(OH)_3$ (average particle diameter: 200 nm), $Al_2O_3$ (average particle diameter: 20 nm), and the $Al_2O_3$@Gr composite was changed to 100:0.07:0.07:0.06.

Comparative Preparation Example 1: Bare LCO

LCO was used as a cathode active material as it is.

Comparative Preparation Example 2: LCO 100 g (Core)/$Al(OH)_3$ 0.05 g (First Shell)/Gr 0.05 g(Second Shell)

A composite cathode active material was prepared in the same manner as in Preparation Example 1, except that Gr (graphene) was used instead of the $Al_2O_3$@Gr composite.

Comparative Preparation Example 3: LCO 100 g (core)/$Al(OH)_3$ 0.05 g, $Al_2O_3$0.03 g (First Shell)/Gr 0.02 g (Second Shell)

A composite cathode active material was prepared in the same manner as in Preparation Example 2, except that Gr (graphene) was used instead of the $Al_2O_3$@Gr composite.

Comparative Preparation Example 4: LCO 100 g (Core)/$Al(OH)_3$ 0.1 g (Shell)

A composite cathode active material was prepared in the same manner as in Preparation Example 1, except that LCO and $Al(OH)_3$ were used at a weight ratio ratio of 100:0.1 and the $Al_2O_3$@Gr composite was not used.

Comparative Preparation Example 5: LCO 100 g (Core)/$Al(OH)_3$ 0.05 g (Shell)

A composite cathode active material was prepared in the same manner as in Preparation Example 1, except that LCO and $Al(OH)_3$ were used at a weight ratio of 100:0.05 and $Al_2O_3$@Gr composite was not used.

Comparative Preparation Example 6: LCO 100 g (Core)/$Al_2O_3$@Gr Composite 0.1 g (Shell)

A composite cathode active material was prepared in the same manner as in Preparation Example 1, except that LCO and $Al_2O_3$@Gr composite were used at a weight ratio ratio of 100:0.1 and $Al(OH)_3$ was not used.

Comparative Preparation Example 7: LCO 100 g (Core)/$Al_2O_3$@Gr Composite 0.05 g (Shell)

A composite cathode active material was prepared in the same manner as in Preparation Example 1, except that LCO and $Al_2O_3$@Gr composite were used at a weight ratio of 100:0.05 and $Al(OH)_3$ was not used.

(Manufacture of Lithium Battery (Half Cell))

Example 1

(Manufacture of Cathode)

A mixture of the composite cathode active material of Preparation Example 1, a carbon conductive material (e.g., Denka Black), and polyvinylidene fluoride (PVdF) mixed at a weight ratio of 96:2:2 was mixed with N-methyl pyrrolidone (NMP) in an agate mortar to prepare a slurry.

The slurry was loaded at 8.5 mg/cm$^2$ on an aluminum current collector having a thickness of 15 μm, bar-coated, dried at room temperature, additionally dried again in vacuum at 120° C., and then rolled and punched to prepare a cathode plate having a thickness of 21 μm and an electrode density of 4.1 g/cc.

(Manufacture of Coin Cell)

Each coin cell was manufactured by using the prepared cathode plate. Here, a lithium metal was used as a counter electrode, a PTFE separator was used, and a solution in which 1.3 M $LiPF_6$ was dissolved in ethylene carbonate (EC)+ethyl propionate (EP)+propylpropionate (PP) (at a volume ratio of 25:30:45) was used as an electrolyte.

Examples 2 to 4 and Comparative Examples 1 to 7

Coin cells were each manufactured in the same manner as in Example 1, except that the composite cathode active material prepared in each of Examples 2 to 4 and Comparative Preparation Examples 1 to 7 were used instead of the composite cathode active material of Preparation Example 1 in Example 1.

Evaluation Example 1: Charge/Discharge Characteristics Evaluation at Room Temperature Each of the lithium batteries prepared in Examples 1 to 4 and Comparative Examples 1 to 7 was charged with a constant current of 0.1 C rate at 25° C. until a voltage reached 4.55 voltage (V) (vs. Li), and was then cut-off at a current of 0.05 C rate while maintaining the voltage at 4.55 V in a constant voltage mode. Subsequently, each of the lithium batteries was discharged at a constant current of 0.1 C rate until the voltage reached 3.0 V (vs. Li) (formation cycle).

Each of the lithium batteries having undergone the formation cycle was charged with a constant current of 0.2 C rate at 25° C. until a voltage reached 4.55 V (vs. Li), and was then cut-off at a current of 0.05 C rate while maintaining the voltage at 4.55 V in a constant voltage mode. Subsequently, each of the lithium batteries was discharged at a constant current of 0.2 C rate until the voltage reached 3.0 V (vs. Li) ($1^{st}$ cycle). Here, direct current internal resistance (DC-IR) was calculated by measuring the voltage drop (V) that occurs while passing current at 1 C for 1 second at SOC 10 (i.e., a state of charging to 10% when the total charging capacity is set to 100%, meaning that a state of discharging to 90%).

Each of the lithium batteries having undergone the $1^{st}$ cycle was charged with a constant current of 1 C rate at 25° C. until a voltage reached 4.55 V (vs. Li), and was then cut-off at a current of 0.05 C rate while maintaining the voltage at 4.55 V in a constant voltage mode. Subsequently, each of the lithium batteries was discharged at a constant current of 1 C rate until the voltage reached 3.0 V (vs. Li) ($2^{nd}$ cycle), and such a cycle was repeated (60 times) under the same conditions until the $60^{th}$ cycle.

Here, for the lithium batteries having undergone the $60^{th}$ cycle, the DC-IR was calculated by measuring the voltage drop (V) that occurs while passing current at 1 C for 1 second at SOC 10 (i.e., a state of charging to 10% when the total charging capacity is set to 100%, meaning that a state of discharging to 90%).

In all charge/discharge cycles, a 10-minute stop time was provided after every one charge/discharge cycle.

Among the results of the charge/discharge test at room temperature, the discharge capacity (0.2 C, mAh/g), initial efficiency (0.2 C, %), DC-IR (Ω, SOC 10), and increase rate of DC-IR (%, after the $60^h$ cycle) are shown in Table 1. The increase rate of DC-IR at the $60^{th}$ cycle is defined by Equation 1:

Increase rate of *DR-IR*[%]=[((*DC-IR* at the $50^{th}$ cycle)-(*DC-IR* at the $1^{st}$ cycle))/*DC-IR* at the $1^{st}$ cycle]×100 Equation 1

Evaluation Example 2: Evaluation of Charge and Discharge Characteristics at High Temperature and High Voltage Each of the lithium batteries prepared in Examples 1 to 4 and Comparative Examples 1 to 7 was charged with a constant current of 0.1 C rate at 45° C. until a voltage reached 4.58 voltage (V) (vs. Li), and was then cut-off at a current of 0.05 C rate while maintaining the voltage at 4.58 V in a constant voltage mode. Subsequently, each of the lithium batteries was discharged at a constant current of 0.1 C rate until the voltage reached 3.0 V (vs. Li) (formation cycle).

Each of the lithium batteries having undergone the formation cycle was charged with a constant current of 0.2 C rate at 45° C. until a voltage reached 4.58 V (vs. Li), and was then cut-off at a current of 0.05 C rate while maintaining the voltage at 4.58 V in a constant voltage mode. Subsequently, each of the lithium batteries was discharged at a constant current of 0.2 C rate until the voltage reached 3.0 V (vs. Li) ($1^{st}$ cycle).

Each of the lithium batteries having undergone the $1^{st}$ cycle was charged with a constant current of 1 C rate at 45° C. until a voltage reached 4.58 V (vs. Li), and was then cut-off at a current of 0.05 C rate while maintaining the voltage at 4.58 V in a constant voltage mode. Subsequently, each of the lithium batteries was discharged at a constant current of 1 C rate until the voltage reached 3.0 V (vs. Li) ($2^{nd}$ cycle), and such a cycle was repeated (60 times) under the same conditions until the $60^{th}$ cycle.

In all charge/discharge cycles, a 10-minute stop time was provided after every one charge/discharge cycle.

Some of the results of the charge/discharge test at high temperature are shown in Table 1. The capacity retention rate at the $60^{th}$ cycle is defined by Equation 2:

Capacity retention (%)=(discharge capacity in $50^{th}$ cycle/discharge capacity in $1^{st}$cycle)×100% Equation 2

TABLE 1

| | Discharge capacity (0.2 C, mAh/g) | Initial efficiency (0.2 C, %) | DC-IR (Ω, SOC 10) | Lifespan at high temperature (45° C.) (%, 60 cycles) | Increase rate of DC-IR (%, 60 cycles) |
|---|---|---|---|---|---|
| Example 1 | 199.1 | 95.0 | 17.6 | 68.2 | 51.2 |
| Example 2 | 198.6 | 94.6 | 20.1 | 69.6 | 51.1 |
| Example 3 | 197.8 | 93.8 | 24.3 | 67.2 | 55.1 |
| Example 4 | 199.7 | 94.8 | 21.6 | 67.1 | 54.1 |
| Comparative Example 1 | 211.7 | 95.7 | 15.9 | 46.5 | 67.8 |
| Comparative Example 2 | 199.1 | 95.0 | 17.6 | 52.4 | 66.0 |
| Comparative Example 3 | 197.6 | 94.8 | 20.2 | 58.9 | 61.0 |
| Comparative Example 4 | 197.1 | 94.7 | 22.9 | 64.6 | 59.2 |
| Comparative Example 5 | 199 | 94.9 | 17.9 | 62.7 | 61.8 |
| Comparative Example 6 | 198.6 | 94.9 | 16.9 | 52.9 | 64.2 |
| Comparative Example 7 | 199.6 | 95.1 | 16.5 | 52.0 | 66.3 |

As shown in Table 1, the lithium batteries of Examples 1 to 4 had low DC-R, improved lifespan characteristics at a high temperature, and a reduced increase rate of DC-IR compared to the lithium batteries of Comparative Examples 1 to 7.

The invention claimed is:

1. A composite cathode active material comprising:

a core including a lithium transition metal oxide; and a first shell and a second shell that are disposed on an outer side of a surface of the core, wherein the first shell comprises at least one first metal compound represented by Formula $X_aO_b$ (where $0<a\leq3$, $0<b\leq4$, and when a is 1, 2, or 3, b is an integer) or Formula $X_a(OH)_b$ (where $0<a\leq3$, $0<b\leq4$, and when a is 1, 2, or 3, b is an integer), the second shell comprises: at least one second metal compound represented by Formula $Y_cO_d$ (where $0<c\leq3$, $0<d<4$, and when c is 1, 2, or 3, d is not an integer); and graphene, the at least one second metal compound is disposed in a graphene matrix, and X and Y are each independently at least one metal selected from Groups 2 to 13, 15, and 16 of the Periodic Table of Elements.

2. The composite cathode active material of claim 1, wherein the first shell and the second shell are sequentially disposed on the outer side of the surface of the core.

3. The composite cathode active material of claim 1, wherein the first shell is directly disposed on the outer side of the surface of the core, and the second shell is directly disposed on an outer side of a surface of the first shell.

4. The composite cathode active material of claim 1, wherein the first shell has a thickness in a range of about 1 nm to about 2 μm.

5. The composite cathode active material of claim 1, wherein the second shell has a thickness in a range of about 1 nm to about 2 μm.

6. The composite cathode active material of claim 1, wherein a metal comprised in the at least one first metal compound comprises at least one metal selected from Al, Nb, Mg, Sc, Ti, Zr, V, W, Mn, Fe, Co, Pd, Cu, Ag, Zn, Sb, and Se.

7. The composite cathode active material of claim 1, wherein a metal comprised in the at least one first metal compound is Al.

8. The composite cathode active material of claim 1, wherein the at least one first metal compound comprises at least one selected from the group consisting of $Al_2O_3$ and $Al(OH)_3$.

9. The composite cathode active material of claim 1, wherein the at least one first metal compound has an average particle diameter in a range of about 10 nm to about 2 μm.

10. The composite cathode active material of claim 1, wherein a metal comprised in the at least one second metal compound comprises at least one metal selected from Al, Nb, Mg, Sc, Ti, Zr, V, W, Mn, Fe, Co, Pd, Cu, Ag, Zn, Sb, and Se.

11. The composite cathode active material of claim 1, wherein the at least one second metal compound is at least one selected from $Al_2O_z$ (where $0<z<3$), $NbO_x$ (where $0<x<2.5$), $MgO_x$ (where $0<x<1$), $Sc_2O_z$ (where $0<z<3$), $TiO_y$ (where $0<y<2$), $ZrO_y$ (where $0<y<2$), $V_2O_z$ (where $0<z<3$), $WO_y$ (where $0<y<2$), $MnO_y$ (where $0<y<2$), $Fe_2O_z$ (where $0<z<3$), $Co_3O_w$ (where $0<w<4$), $PdO_x$ (where $0<x<1$), $CuO_x$ (where $0<x<1$), $AgO_x$ (where $0<x<1$), $ZnO_x$ (where $0<x<1$), $Sb_2O_z$ (where $0<z<3$), and $SeO_y$ (where $0<y<2$).

12. The composite cathode active material of claim 1, wherein the second shell comprises at least one selected from: a composite comprising the at least one second metal compound and the graphene; and a milling product of the composite.

13. The composite cathode active material of claim 12, wherein the graphene has a branched structure, and the at least one second metal compound is distributed in the branched structure, and the branched structure comprises a plurality of graphene particles in contact with one another.

14. The composite cathode active material of claim 12, wherein the graphene has at least one structure selected from a spherical structure, a spiral structure in which the spherical structures are linked to one another, and a cluster structure in which the spherical structures are aggregated, the at least one second metal compound is distributed in the spherical structure, and a size of the spherical structure is in a range of about 50 nm to about 300 nm, a size of the spiral structure is in a range of about 500 nm to about 100 μm, and a size of the cluster structure is in a range of about 0.5 mm to about 10 cm, the composite has a crumpled faceted-ball structure or a planar structure, and the at least one second metal compound is distributed inside or on the surface of this structure, and the graphene extends from the at least one second metal compound by a distance of less than or equal to about 10 nm, and comprises at least 1 to 20 graphene layers, and a total thickness of the graphene is in a range of about 0.6 nm to about 12 nm.

15. The composite cathode active material of claim 1, wherein a total sum of a weight of the at least one first metal compound, a weight of the at least one second metal compound, and a weight of the graphene is in a range of about 0.001 wt % to about 1 wt % based on a weight of the core.

16. The composite cathode active material of claim 1, wherein the lithium transition metal oxide is represented by Formula 1 or 2:

$$Li_{a1}Co_{x1}M_{y1}O_{2-b1}A_{b1} \qquad \text{Formula 1}$$

wherein, in Formula 1, $1.0 \le a1 \le 1.2$, $0 \le b1 \le 0.2$, $0.9 \le x1 \le 1$, $0 \le y1 \le 0.1$, and $x1+y1=1$, M is manganese (Mn), cobalt (Co), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A is F, S, CI, Br, or a combination thereof:

$$LiCoO_2 \qquad \text{Formula 2.}$$

17. A cathode comprising the composite cathode active material of claim 1.

18. A lithium battery comprising the cathode of claim 17.

19. A method of preparing a composite cathode active material, the method comprising:

providing a lithium transition metal oxide;

providing at least one first metal compound represented by Formula $X_aO_b$ (where $0<a\le3$, $0<b\le4$, and when a is 1, 2, or 3, b is an integer) or Formula $X_a(OH)_b$ (where $0<a\le3$, $0<b\le4$, and when a is 1, 2, or 3, b is an integer);

providing a composite comprising: at least one second metal compound represented by Formula $Y_cO_d$ (where $0<c\le3$, $0<d<4$, and when c is 1, 2, or 3, d is not an integer); and graphene, wherein the at least one second metal compound is disposed in a graphene matrix; and mechanically milling the lithium transition metal oxide, the at least one first metal compound, and the composite, wherein X and Y are each independently at least one metal selected from Groups 2 to 13, 15, and 16 of the Periodic Table of Elements.

20. The method of claim 19, wherein the at least one first metal compound has an average particle diameter in a range of about 1 nm to about 2 μm, and the at least one first metal compound comprises at least one selected from the group consisting of $Al_2O_3$ and $Al(OH)_3$.

* * * * *